United States Patent [19]
Neubauer et al.

[11] Patent Number: 5,438,516
[45] Date of Patent: Aug. 1, 1995

[54] INTEGRATED VEHICLE BRAKE CONTROL DEVICE POSITION SENSOR WITH PRECALIBRATED MULTIPLE SENSOR OUTPUTS

[75] Inventors: Keith A. Neubauer, Milwaukie; Jay D. Byler; Kathleen K. Brown, both of Beaverton, all of Oreg.

[73] Assignee: Williams Controls, Inc., Portland, Oreg.

[21] Appl. No.: 145,692

[22] Filed: Oct. 29, 1993

[51] Int. Cl.⁶ .......................... B60T 8/26; B60T 13/02
[52] U.S. Cl. .................... 364/426.01; 364/571.01; 303/7; 303/961; 303/973; 188/21; 188/65.3; 74/514; 74/551.8
[58] Field of Search ........................ 364/426.01, 571.01; 123/399, 361, 363, 376; 74/514, 551.8, 560; 180/335; 188/21, 65.3, 272; 303/7, 9.61, DIG. 4, 9.62, 9.66, 9.73, 9.74, 113.5

[56] References Cited

U.S. PATENT DOCUMENTS

| | | | |
|---|---|---|---|
| 4,603,921 | 8/1986 | Liggett | 303/6 C |
| 4,677,557 | 6/1987 | Stumpe | 364/426.01 |
| 4,718,380 | 1/1988 | Katayose et al. | 123/399 |
| 4,848,852 | 7/1989 | Inoue et al. | 303/100 |
| 4,883,037 | 11/1989 | Mabee et al. | 123/399 |
| 5,042,883 | 8/1991 | McCann et al. | 303/7 |
| 5,133,321 | 7/1992 | Hering et al. | 123/399 |
| 5,141,292 | 8/1992 | Gardell et al. | 303/7 |
| 5,251,966 | 10/1993 | Friederichs et al. | 303/7 |
| 5,281,006 | 1/1994 | Götz et al. | 303/7 |

Primary Examiner—Kevin J. Teska
Assistant Examiner—Tan Nguyen
Attorney, Agent, or Firm—Robert L. Harrington

[57] ABSTRACT

An integrated throttle position validation sensor includes electrically independent throttle position and position validation components responsive to a single mechanical input applied to a protective sensor housing. By suitable mounting to the throttle control device, the mechanical input corresponds to accelerator pedal position. Within the sensor housing a potentiometer moves with the mechanical input whereby a variable voltage throttle position signal is generated. Also, within the housing a separate validation switch responsive to the mechanical input provides an independent representation of throttle control device position in the form of, for example, a bi-state validation signal. The sensor integrates previous separate throttle control position and position validation functions into a single environmentally secure housing which requires no calibration. The integrated sensor is more reliable and less costly than previously available separate throttle control and idle validation functions.

19 Claims, 10 Drawing Sheets

INTEGRATED VEHICLE BRAKE CONTROL DEVICE POSITION SENSOR WITH PRECALIBRATED MULTIPLE-SENSOR OUTPUTS

BACKGROUND OF THE INVENTION

The present invention applies to engine control systems and particularly to sensors for brake control position.

Many vehicle throttle control systems now use electrical circuitry to deliver an electrical signal from the accelerator or throttle control device, e.g., an accelerator pedal or hand control lever, to an electronic control system, e.g., fuel delivery system. For example, a voltage signal provided to the electronic fuel control system corresponds to accelerator pedal or hand control position. When an "in-range" voltage level arrives at the electronic fuel control system, the electronic fuel control system responds by injecting a corresponding volume of fuel into the engine fuel system.

In some applications, an accelerator control device failure can result in an invalid in-range throttle condition, i.e., an unintended in-range voltage level. Under such condition, even though the accelerator control device is at, for example, an idle position, the electronic fuel control system receives an erroneous throttle control signal and undesirably injects fuel into the engine fuel system. Loss of engine throttle control, and possibly unintended vehicle acceleration, can result. To avoid such an error condition, a separate idle validation switch has been added to the accelerator control device as backup protection against such a failure. U.S. Pat. No. 4,958,607 issued Sep. 25, 1990 to Lundberg and entitled Foot Pedal Arrangement For Electronic Throttle Control Of Truck Engines shows a throttle control arrangement in FIG. 1 thereof including separately mounted a microswitch responsive to a given position of the pedal for delivery of a idle validation signal to a computer controlling engine throttle functions. Typically, this switch provides a function wherein one side of the switch delivers a logic signal corresponding to valid idle operation and the other side validates throttle active operation. The switch slidably mounts to the accelerator control device in such a way that actuation of the accelerator control changes the switch position from its idle validation position to its throttle validation position according to a given, and often very precise, calibration. The electronic fuel control system ignores the throttle control signal until it receives a throttle validation signal by way of the switch.

Accordingly, if an erroneous in-range throttle signal arrives at the electronic fuel control system, unintended fuel delivery is avoided because the electronic fuel control system has not yet received a throttle validation signal.

The idle validation switch attaches to the accelerator pedal or hand control as a separate component. The switch slidably and separately mounts to the accelerator control device in such manner to provide the switching point at a particular pedal or hand control lever position. It is necessary to adjust or calibrate the point at which the switching occurs to coincide with a specified throttle signal level, i.e., a point of transition between idle and throttle operation. This insures that the switch is in the idle valid mode when the driver releases the accelerator control device, and that the engine will have a smooth idle to power transition when the driver applies the throttle. Switch transition points are typically specified by the engine manufacturer.

Installation of the separate idle validation switch can be difficult because of the sensitive calibration required to meet the engine manufacturer's specifications, and the complex test procedures needed to insure that proper switch functioning occurs. Additionally, the switch must meet stringent standards to function reliably in typical operating environments.

The calibration requirements of the separately mounted idle validation switch of Lundberg can expose a trucking concern to potentially thousands of dollars in costs in the event of switch failure. Consider a situation where a truck driver encounters a failure of such throttle equipment while in route. The truck driver would likely tow the truck to an authorized repair service and not only obtain the parts necessary to replace the peddle assembly, but also employ a qualified repair person to accomplish the necessary calibration between the separate idle validation switch and the throttle position sensor. As may be appreciated, the time and money lost in accomplishing such repairs can be significant.

These factors result in an expensive throttle control with validation switch and, in some cases, marginal product reliability. The resulting product is also virtually impossible to service in the field without extensive expert calibration. In some cases the entire accelerator control assembly is necessarily replaced. Such difficult field service further adds to the overall cost of such throttle validation systems.

Similar considerations apply to vehicle braking systems with sensor circuitry delivering, in response to brake pedal actuation, an electrical signal to a brake control system, the electrical signal represents operator controlled brake pedal position. Thus, the electrical signal developed can represent, e.g., by voltage magnitude, a degree of braking function required in response to operator actuated brake pedal position. Because the braking system reacts to an electrical signal, the electrical signal must be valid with respect to operator intent. It is disastrous if the brake system fails to deliver the appropriate electrical signal relative to the operator actuated brake pedal position. Equally disastrous, the braking system could suddenly apply a braking function to the vehicle in the absence of any operator actuated brake pedal position. Furthermore, the operator actuated brake pedal position must be accurately represented in the electrical signal developed at the brake pedal and delivered to the brake control system.

Thus, vehicle control devices providing a vehicle operating function, e.g., a braking function, in response to operator manipulation of such devices are improved by a more reliable and more easily validated electrical signal produced. Furthermore, in some vehicle applications it may be desirable to produce multiple signals representing vehicle control device position. To the extent that such multiple sensor signals can be generated and precisely calibrated according to given specifications, overall vehicle operation is improved.

The subject matter of the present invention addresses these concerns with respect to vehicle control devices producing electrical signals representing control device position.

SUMMARY OF THE INVENTION

The present invention contemplates application of an integrated sensor to vehicle brake control devices to provide such improvement as brake signal validation and coordinated operation of separate braking systems. For example, an integrated sensor of the present invention can develop in precalibrated coordination with a brake signal a validation signal which may be employed by the brake control system to validate operator actuation of a brake pedal. Coordinated operation of separate braking systems may include initiation of a braking function with respect to a rear braking system prior to initiation of a braking function in relation to a front braking system. In this manner, the precalibrated brake signal outputs of the sensor under the present invention orchestrate braking between front and rear braking systems for improved, e.g., rear first, vehicle braking. Another embodiment of the invention establishes coordinated operation of separate braking systems including conventional frictional systems and auxiliary retarder brake systems.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
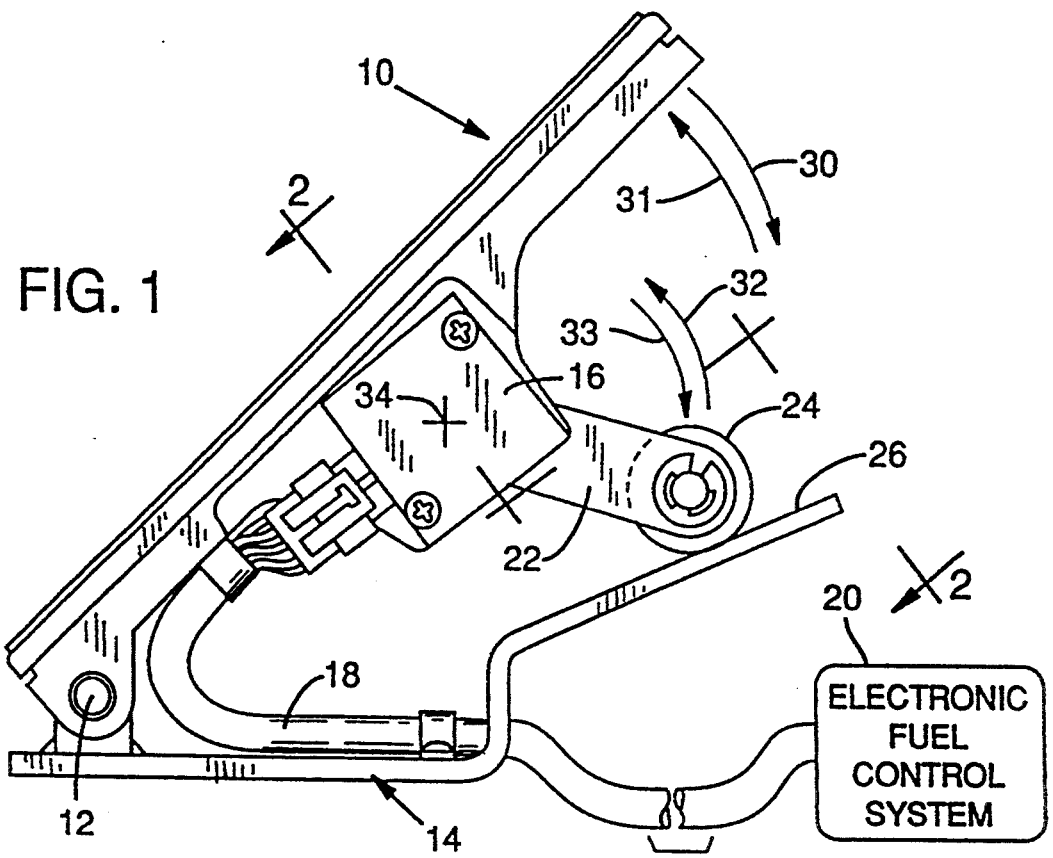
FIG. 1 is a side view of an accelerator pedal, an integrated throttle control and idle validation sensor, and an electronic fuel control system.

FIG. 1 shows a throttle control device, i.e., an accelerator pedal 10, pivotally coupled at pin 12 to a base plate 14. Base plate 14 attaches to the floor of a vehicle (not shown) in conventional manner. An integrated throttle control and idle validation sensor 16 mounts to the underside of pedal 10 for the combined functions of providing a throttle control signal, an idle validation signal, and a throttle validation signal. Sensor 16 couples by way of multi-conductor cable 18 to an electronic fuel control system 20. System 20 is a conventional control system, and in the illustrated embodiment corresponds to a Cummins electronic fuel control system available under the trade name CELECT. While illustrated with reference to a specific electronic fuel control system, it will be appreciated by those skilled in the art that sensor 16 may be adapted to operate with a wide variety of engine control systems and control devices.

A lever arm 22 pivotally mounts to sensor 16 and carries a roller 24 at its distal end. Base plate 14 includes an inclined surface 26 engaged by roller 24. As the operator depresses pedal 10 to accelerate the vehicle, pedal 10 rotates about pin 12 in the direction 30, clockwise in the view of FIG. 1. As roller 24 moves upward along surface 26 in response to downward actuation of pedal 10, lever arm 22 pivots in the direction 32, counter clockwise in the view of FIG. 1, about the axis 34. Sensor 16 detects such movement of lever arm 22 and delivers to system 20 by way of cable 18 suitable signals separately indicating and independently validating the position of pedal 10.

Figure 2:
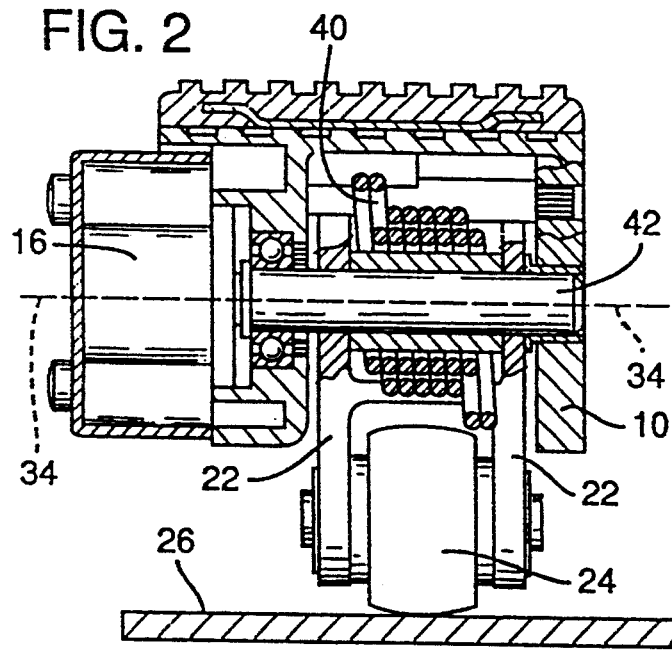
FIG. 2 is a sectional view of the pedal and sensor of FIG. 1 taken along lines 2—2 of FIG. 1.

FIG. 2 shows a sectional view of the assembly of FIG. 1 taken through the sensor 16 and arm 22. In FIG. 2, a double spring 40 encircles a shaft 42 mounted upon the body of pedal 10 for rotation about the axis 34. Spring 40 couples the underside of pedal 10 and lever arm 22 to bias lever arm 22 in the direction 33 opposite that of direction 32. Pedal 10 is thereby spring biased in the direction 31, opposite of direction 30, and toward the idle position as shown in FIG. 1. The shaft 42, pivotally mounts to the body of pedal 10, but fixedly attaches to lever arm 22 such that movement of pedal 10 results in rotation of shaft 42 relative to sensor 16 and about the axis 34. Sensor 16, being mechanically coupled to shaft 42, responds to rotation of shaft 42 by producing the desired throttle control, idle validation, and throttle validation signals according to pedal 10 position as described hereinafter.

Figure 3:
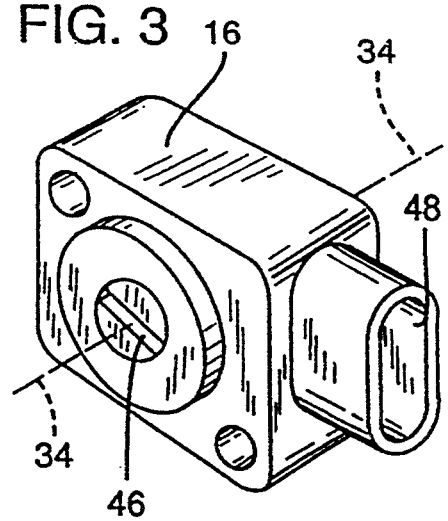
FIG. 3 is a perspective view of the integrated throttle control and idle validation sensor of FIG. 1.

FIG. 3 shows in perspective the throttle control and idle validation sensor 16. Sensor 16 includes a slot formation 46 for mechanical coupling to shaft 42 and an electrical connector formation 48 for electrical coupling to multi-conductor cable 18. Shaft 42 engages slot formation 46 and rotates slot formation 46 about the axis 34 as a mechanical input to sensor 16. Movement of pedal 10 about pin 12 results in mechanical input, by way of shaft 42, to sensor 16 at slot formation 46. In response, sensor 16 generates the necessary signals at the connector formation 48 for delivery by way of cable 18 to electronic fuel control system 20. It will, therefore, be appreciated by those skilled in the art that sensor 16 provides an integrated package receiving a mechanical input and delivering suitable electrical outputs. Sensor 16 requires no calibration for idle validation relative to throttle control as such calibration is built into the integrated package at the time of manufacture. Also, by enclosing the throttle control and idle validation functions in the housing of sensor 16, the risk of exposure to environmental conditions, possibly effecting operation of sensor 16, is substantially eliminated.

Figure 4:
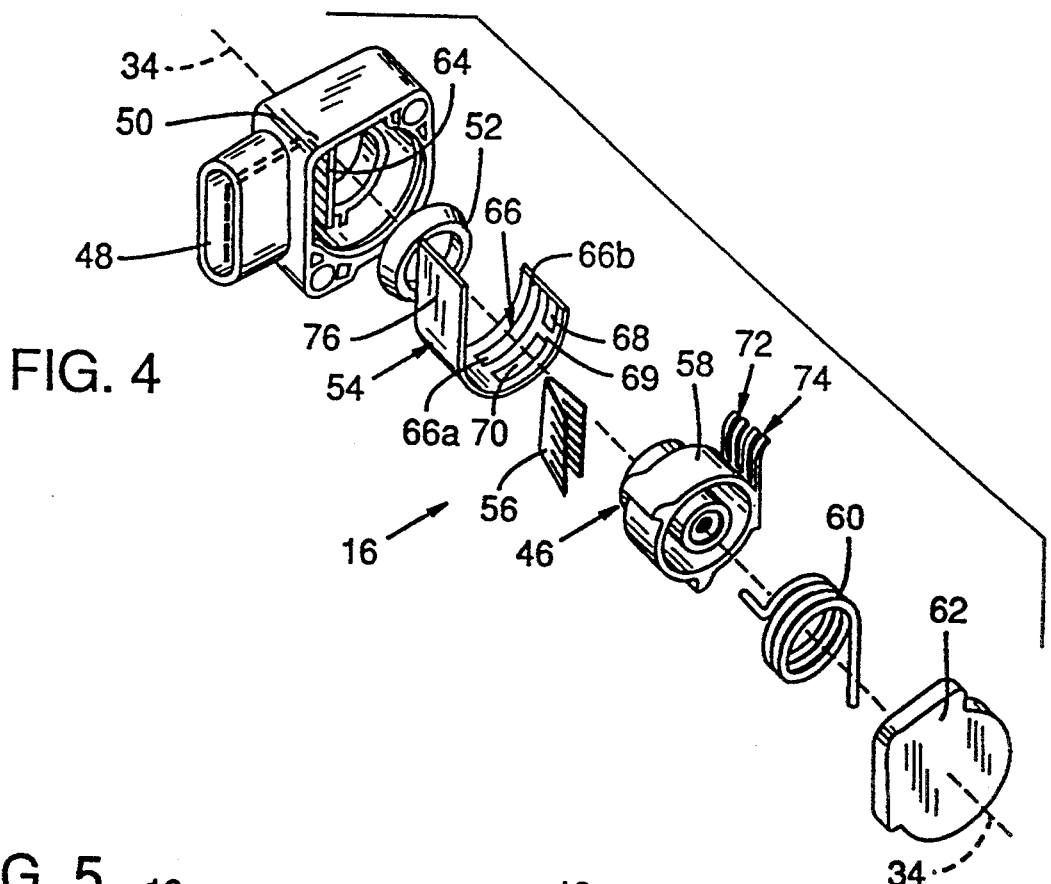
FIG. 4 is an exploded view of the sensor of FIG. 3.

FIG. 4 is a view of sensor 16 exploded along the axis 34. In FIG. 4, sensor 16 comprises an external housing 50, a seal 52, a screened film element 54, a termination wedge 56, a rotor 58, a spring 60, and a cover 62. Within housing 50, a terminal structure 64 carries conductive elements, corresponding to those of cable 18, from within the connector formation 48 to the interior of housing 50. As described more fully below, the screened film element 54 includes a resistive element 66, an idle conductive element 68, and a throttle conductive element 70 suitably etched onto the substrate of film element 54. The rotor 58 includes a throttle wiper 72 and an idle/throttle validation wiper 74. In assembly of sensor 16, seal 52 first inserts within housing 50, then film element 54 rests within housing 50 such that elements 66, 68, and 70 of film element 54 face inward. A flat portion 76 of screened film element 54 rests adjacent the terminal structure 64. Film element 54 includes additional conductive traces (not shown) for coupling elements 66, 68, and 70 to suitable terminal contact points (not shown) of flat portion 76. The termination wedge 56 suitably interconnects the elements 66, 68, and 70 of element 54, by way of the terminal contacts (not shown) of flat portion 76, with the conductors of terminal structure 64. Electrical coupling between individual conductors of cable 18 and portions of film element 54 is thereby established.

Rotor 58 inserts within housing 50 interior of film element 54 and the wipers 72 and 74 contact portions of film element 54. More particularly, the throttle wiper 72 contacts the resistive element 66 of film element 64 and the idle/throttle validation wiper 74 selectively contacts one of, or neither of, the idle conductive element 68 and the throttle conductive element 70. Seal 52 seals rotor 58 within housing 50 while allowing rotation about the axis 14. Spring 60 couples rotor 58 and housing 50 to suitably bias rotor 58 toward a full return position. Cover 62 attaches to housing 50 to rotatably support rotor 58 and to seal the entire assembly. Rotor 58 includes the slot formation 46 (not shown but indicated by numeral 46 in FIG. 4). Rotor 58 then rotates within housing 50 and about the axis 34 according to rotation of shaft 42, i.e., in response to operator actuation of pedal 10. Throttle wiper 72 thereby moves along resistive element 66 while, for given ranges of angular position for rotor 58, validation wiper 74 contacts one of the idle validation conductive element 68, a non-conductive portion 69, or idle validation conductive element 70.

Figure 5:
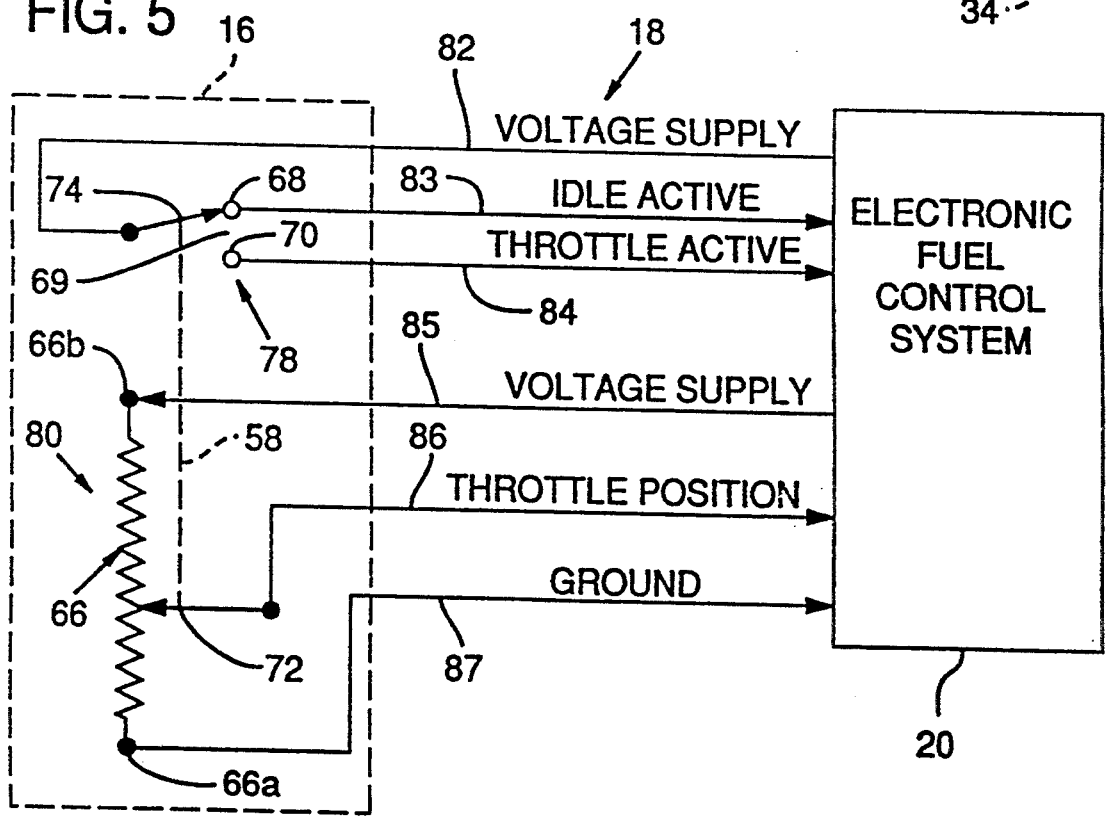
FIG. 5 is a schematic diagram of the sensor and electronic fuel control system showing electronic coupling.

FIG. 5 illustrates electrical connections between portions of the sensor 16 and the electronic fuel control system 20 as established by the conductors of cable 18. In FIG. 5, the validation wiper 74 together with conductive elements 68 and 70 and nonconductive portion 69 comprise a switch 78. The resistive element 66 and throttle wiper 72 comprise a potentiometer 80. Switch 78 and potentiometer 80 are mechanically coupled by way of rotor 58, but are electrically separate. A voltage supply conductor 82 of cable 18 connects, by way of structure 64, wedge 56, and conductive traces of film element 54, to wiper 74, i.e., to the common pole of switch 78. An idle active conductor 83 of cable 18 couples in similar manner to idle conductive element 68. A throttle active conductor 84 of cable 18 similarly couples to throttle conductive element 70. Switch 74 selectively routes the supply voltage present on conductor 82 to neither or to one of cable conductors 83 and 84 for interpretation by electronic fuel control system 20. A supply voltage potential on idle active conductor 83 validates an idle position for pedal 10 while a supply voltage potential on throttle active conductor 84 validates an in-range throttle control signal. A supply voltage on neither of conductors 83 and 84, i.e., an open connection, indicates to system 20 a transition between an idle active and a throttle active condition of pedal 10.

A second voltage supply conductor 85 of cable 18 delivers a supply voltage to end 66b of resistive element 66 while a ground conductor 87 of cable 18 connects to the opposite end 66a of resistive element 66 as a ground return to electronic fuel control system 20. A throttle position conductor 86 of cable 18 couples to wiper 72 of potentiometer 80 whereby the voltage potential on throttle position conductor 86 corresponds to the position of wiper 72, more particularly, to the position of pedal 10.

As noted above, the switch 78 and potentiometer 80 are mechanically coupled by way of rotor 58. As rotor 58 moves from its full return position through a given range of angular movement, corresponding to full actuation of pedal 10, wiper 72 moves from near end 66b toward end 66a of resistive element 66. Concurrently with such rotation of rotor 58, wiper 74 initially contacts conductive element 68, but as rotor 58 moves through a given angular transition zone range, it disengages conductive element 68 as it rests against nonconductive portion 69. At the end of this transition zone range, wiper 74 contacts conductive element 70. Thus, rotation of rotor 58 through its angular range of motion corresponds to a continuously variable voltage signal on throttle position conductor 86, and suitable presentation of discrete bi-state logic validation signals on idle active conductor 83 and throttle active conductor 84.

In the preferred embodiment, rotor 58 has a full range of approximately 70 degrees of rotation corresponding to movement of pedal 10 from idle to full acceleration. The transition zone range, between idle validation and throttle validation, is determined by the extent of nonconductive portion 69 of film element 54 separating conductive elements 68 and 70. As will be apparent to those skilled in the art, a variety of configurations for sensor 16 will yield a variety of rotor 58 movement ranges and transition zone ranges as desired.

Figure 6:
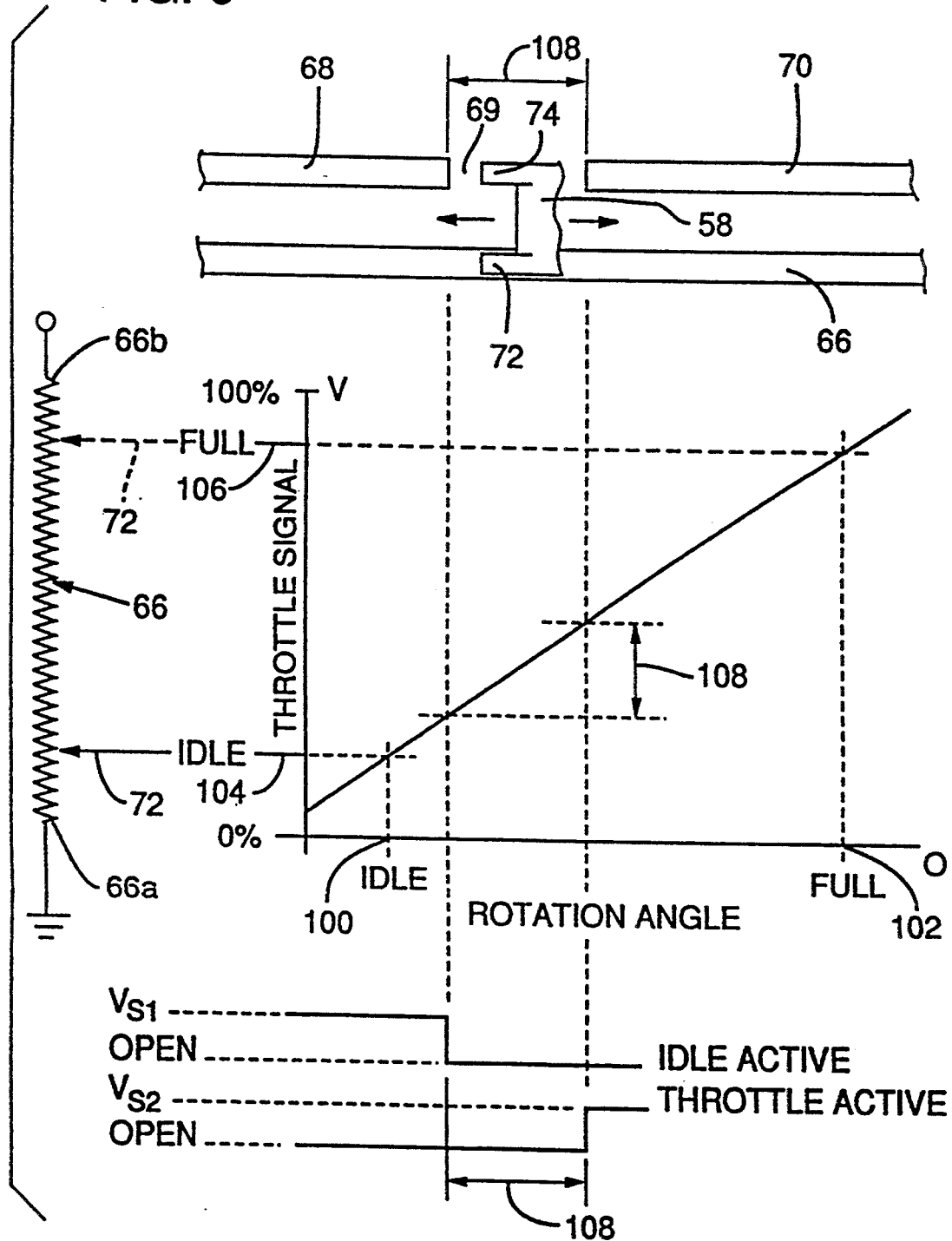
FIG. 6 illustrates the relationship between mechanical operation of the sensor and production of the throttle control signal, idle validation signal and throttle validation signal.

FIG. 6 relates the wiper 72 position in terms of a rotation angle of rotor 58 on the horizontal axis to the throttle control signal voltage, on the vertical axis, delivered to electronic fuel control system 20 by way of conductor 86. As the angular position of rotor 58 moves from an idle position 100 to a full throttle position 102, the voltage at wiper 72 ramps linearly from an idle voltage 104 to a full throttle voltage 106. The wiper 74 similarly moves from contact with idle conductive element 68 through a transition zone 108 and on to contact with throttle conductive element 70. Thus, as rotor 58 moves from its idle position 100 to its full throttle position 102, the voltage on conductor 83 of cable 18, representing an idle active signal, remains at the supply voltage $V_{s1}$ until wiper 74 loses contact with conductive element 68. At this time the idle active conductor 83 of cable 18 presents an open circuit to system 20. Continuing with rotation of rotor 58 toward the full throttle position 102, wiper 74 eventually contacts conductive element 70 whereat the voltage on conductor 84 of cable 18, representing a throttle active signal, moves from being open to the supply voltage potential $V_{s2}$.

Electronic fuel control system 20 monitors the throttle position conductor 86, idle active conductor 83 and throttle active conductor 84 of cable 18. A supply voltage potential on idle active conductor 83 validates the idle position for pedal 10 and system 20 ignores the signal on throttle position conductor 86. A supply voltage potential on throttle active conductor 84 validates an in-range throttle control signal on throttle position conductor 86 and an appropriate volume of fuel is delivered to the vehicle engine. An open circuit on both of conductors 83 and 84 indicates to system 20 a throttle transition between an idle condition and a throttle condition. System 20 reacts as programmed according to the necessary engine specification requirements for transition between idle and throttle.

Figure 7:
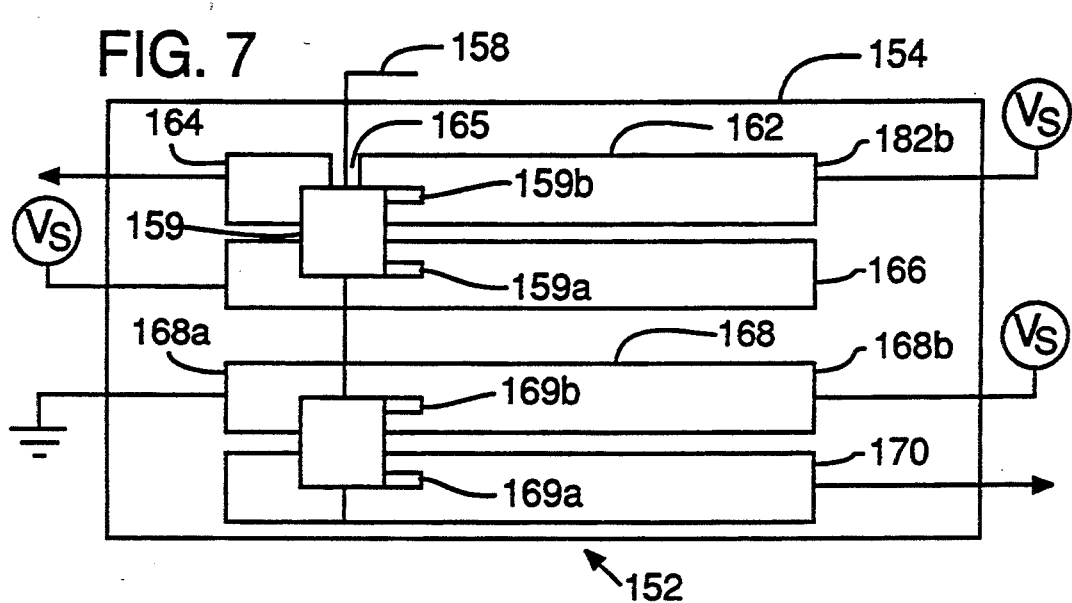
FIGS. 7-9 illustrate schematically alternative embodiments of the present invention.
Figure 8:
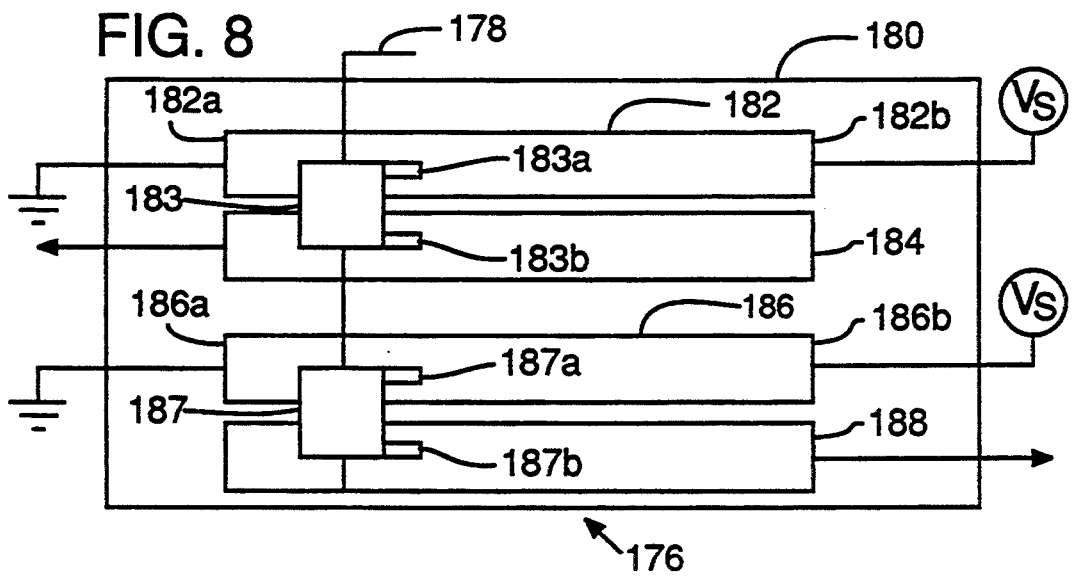
Figure 9:
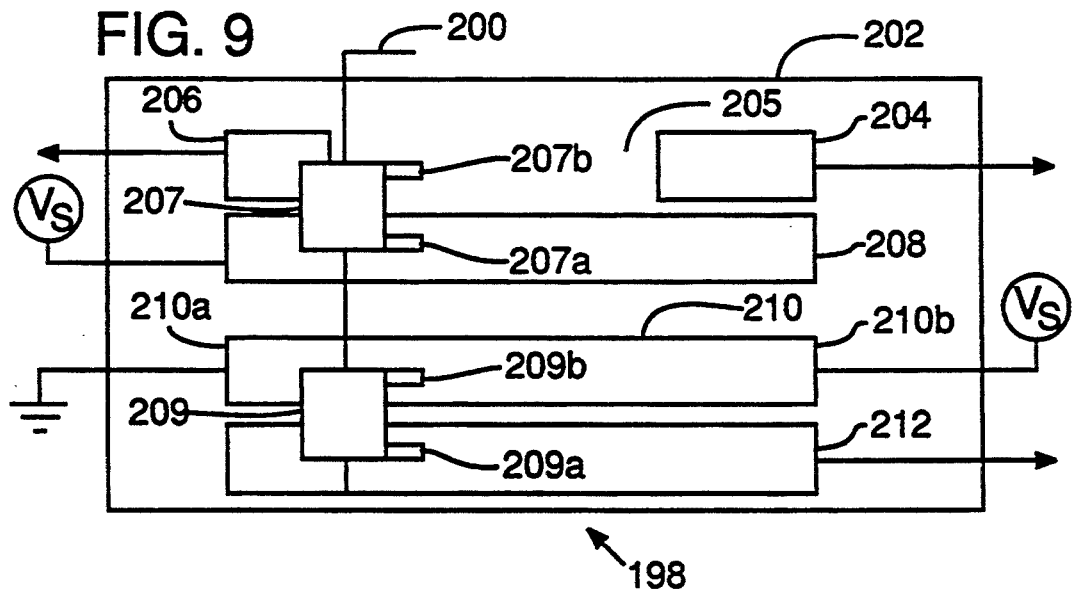

FIGS. 7-9 show alternative embodiments of the present invention. In the illustration of FIGS. 7-9, the integrated sensor arrangement is shown schematically as including a screened film element carrying conductive portions and resistive elements similar to that of screened film element 54 described above. A rotor, similar to rotor 58 above, reacts to the mechanical input and carries wipers for engagement of the various conductive portions and resistive elements of the screened film element. It will be understood, therefore, that while illustrated schematically in FIGS. 7-9, these embodiments of the present invention may be implemented in the manner of the above described embodiment in a common housing and responsive to a common mechanical input.

FIG. 7 illustrates a complimentary idle validation switch and throttle control device position sensor 152 similar to the sensor 16 described above. In other words, the sensor 152 provides a throttle control device position signal and a separate idle validation signal which indicates or verifies the throttle condition or idle condition of the throttle control device. In FIG. 7, the sensor 152 includes a screened film element 154. Screened film element 154 carries, in implementation of the idle validation switch, conductive portions 162 and 164 which lie generally along a common wiper path, but are separated by a nonconductive portion 165. Lying parallel to the path of conductive portions 162 and 164, a conductive portion 166 carries a supply voltage potential.

A rotor 158 moves relative to the screened film element 154 and includes a bridge wiper element 159 with separate but conductively coupled legs 159a and 159b. The wiper element 159 thereby conductively bridges selected portions of the screened film element according to movement of rotor 158 movement. Wiper element 159 conductively bridges the portion 166 and one of the conductive portions 162 and 164 to implement an idle validation switch reactive to movement of the rotor 158. More particularity, wiper leg 159a remains in contact continuously with the conductive portion 166 and thereby carries the supply voltage potential. Wiper leg 159b engages one of the conductive portion 162, the nonconductive portion 165, or the conductive portion 164 according to the rotor 158 position.

As the rotor 158 moves from an idle position through a full throttle position the wiper element 159 delivers the supply voltage into the conductive portion 164 during an idle condition, delivers nothing across the nonconductive portion 165 during a transition between idle and throttle active conditions, and delivers the supply voltage into the conductive portion 162 during a throttle active condition. The potential at conductive portion 164 may be delivered by way of a multi-conductor cable to an engine control system. The engine control system then interprets a supply voltage potential at conductive portion 164 as an independent validation of an idle condition. Similarly, a supply voltage at the conductive portion 162 independently verifies a throttle active condition.

Sensor 152 provides a throttle position signal representative of the position of the rotor 158 relative to the screened film element 154, i.e. representative of the position of an associated throttle control device driving the rotor 158. In implementation of the throttle position signal, the sensor 152 includes a resistive element 168 having at one end 168a a connection to ground potential and at the opposite end 168b a connection to a supply voltage potential. A bridge wiper element 169, carried by the rotor 158, includes a first leg 169a in electrical contact with a conductive portion 170 of screened film element 154. A second leg 169b of the wiper element 169 remains in electrical contact with the resistive element 168 providing a voltage divide function whereby the voltage potential at the legs of wiper element 169, and, therefore at the conductive portion 170, represents the position of the associated throttle control device.

Sensor 152 thereby provides a reliable throttle position signal and independently validates a variety of conditions relative to the throttle control device associated with the sensor 152.

The integrated sensor 176 shown in FIG. 8 is a dual throttle control device position sensor. The sensor 176 provides two output signals, each representative of a throttle control device position along a given throttle control device range of movement. In this manner, one of the throttle control device position signals may be used to validate the other throttle control device signal, e.g., as by comparing the voltage potential of each signal. Alternatively, the two throttle control device position signals provided by the sensor 176 may be used in a twin engine application to deliver identical throttle control position signals to separate engine systems.

In FIG. 8, the sensor 176 includes a screened film element 180 and a rotor 178 which moves relative to the screened film element 180 according to movement of the associated throttle control device. The screened film element 180 includes a first resistive element 182 having at one end 182a an electrical connection to a ground potential and at the opposite end 182b and electrical connection to a supply potential. A conductive portion 184 lies adjacent and parallel to the resistive element 182. Bridge wiper element 183 includes a leg 183a in sliding electrical contact with the resistive element 182 and a second leg 183b in sliding electrical engagement with the conductive portion 184. The legs 183a and 183b are conductively coupled to bridge resistive element 182 and conductive portion 184. As the rotor 178 moves according to movement of the associated throttle control device, wiper 183 moves along the resistive element 182 and provides a voltage divide function representing throttle control device position according to potential at the bridge wiper 183. A throttle control device position signal is then taken from the conductive portion 184.

A similar arrangement is provided for the second throttle control device position signal. More particularly, a second resistive element 186 couples to a ground potential at its end 186a and to a supply voltage potential at its opposite end 186b. Bridge wiper element 187 includes a first leg 187a in electrical contact with the resistive element 186 and providing a voltage divide function according to the position of the rotor 178, i.e., according to the position of the associated throttle control device. A second leg 187b of the wiper 187, electrically coupled to the first leg 187a, electrically engages a conductive portion 188 lying adjacent and parallel to the resistive element 186. Thus, the potential at the conductive portion 188 may be taken as being representative of the associated throttle control device position.

FIG. 9 illustrates an integrated idle validation, transmission kick-down and throttle control device position sensor 198. In FIG. 9, sensor 198 includes a screened film element 202 carrying conductive portions 204 and 206 in alignment along a wiper leg path, but separated by a nonconductive portion 205. A conductive portion 208 lies parallel to the path of conductive portions 204 and 206. Bridge wiper 207 mounts to rotor 200 of the sensor 198 whereby wiper element 207 moves according to movement of the associated throttle control device. Conductive portion 208 carries a supply voltage potential. A first wiper leg 207a receives the supply voltage potential of conductive portion 208 and delivers this potential to the second leg 207b. As the rotor 200 moves from an idle condition through a full throttle condition, the wiper leg 207b contacts sequentially the conductive portion 206, the nonconductive portion 205, and finally the conductive portion 204.

An idle validation signal taken from the conductive portion 206 corresponds to a valid idle condition when the conductive portion 206 carries the supply voltage potential. A transmission kick-down signal taken from the conductive portion 204 represents a kick-down condition when the conductive portion 204 carries the supply voltage potential. A throttle position signal is taken from a conductive portion 212 of the screened film element 202 in a manner similar to that described above. More particularly, a resistive element 210 couples at its end 210a to a ground potential and its end 210b to a supply voltage potential. A bridge wiper 209 mounts to rotor 200. A first wiper leg 209a lies in sliding electrical contact with the conductive portion 212. A second leg 209b slidingly and electrically engages the resistive element 210. Thus, as the rotor 200 moves from an idle condition through a full throttle condition the leg 209b provides a voltage divide function and delivers a voltage potential to the conductive portion 212 corresponding to the position of the associated throttle control device.

FIGS. 7–9 illustrate the versatility of the present invention in providing accurate and independent throttle control position and position validation signals according to a desired pre-calibration. In the illustrated embodiments, an integrated throttle position sensor and position validation sensor are provided within a common housing and react to a common mechanical input to provide suitable electrical outputs for delivery to an engine control system, e.g. a fuel delivery system or a transmission control system. In any case, the integrated throttle position and validation sensor of the present invention is useful where it is desirable to provide a throttle position signal and a separate, i.e. independent, indication of throttle control device position.

Thus, an integrated throttle position and position validation sensor has been shown and described. The integrated package reacts to accelerator pedal position by way of a single mechanical input and delivers suitable electrical signals as outputs to the electronic vehicle control system. The sensor enjoys protection from environmental conditions, i.e., the cab environment, by virtue of its integrated packaging. Installation requires no calibration.

The integrated throttle position sensor with independent position validation sensor as illustrated herein avoids many costs associated with failure of prior throttle control with separate validation signal systems. More particularly, the validation and throttle position sensors as integrated and pre-calibrated at the time of manufacture within a signal housing requires only that the truck operator obtain a signal replacement part for a failed throttle control system and mount the part to the pedal assembly. The entire pedal assembly need not be replaced. Given the availability of overnight delivery services, the replacement part, i.e., as integrated within a common housing, can be obtained in short time. Thus, under such repair process the operator would only need sufficient time to obtain the replacement part, and no specially trained personnel would be required to service the truck. Because the throttle control system of the present invention provides physically integrated throttle position and throttle validation sensors, calibration therebetween is not required in the field. Accordingly, the repair process is less costly, greatly shortened and simple enough to be accomplished by the driver or an ordinary repair person.

Figure 10:
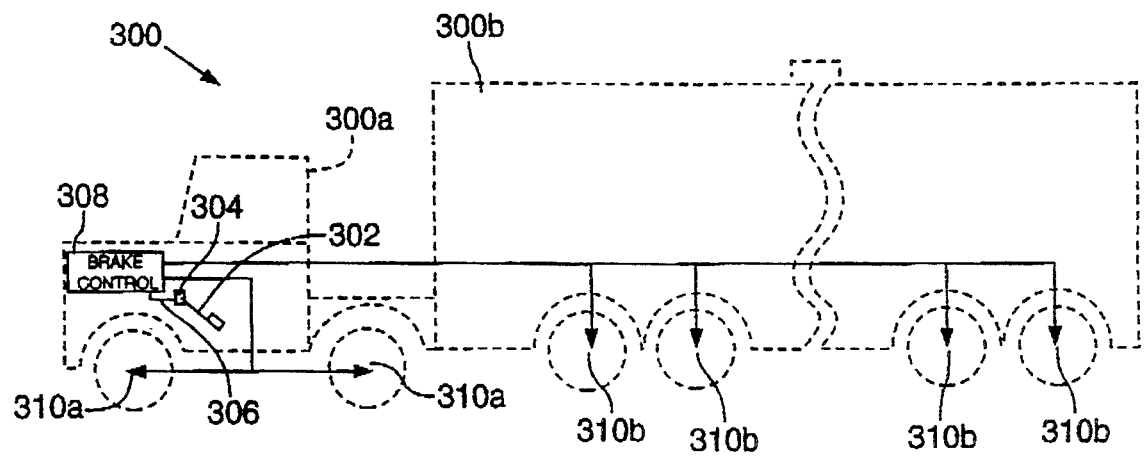
FIG. 10 illustrates a vehicle including separate brake systems, i.e., front and rear brake systems, for operation in response to corresponding first and second outputs of a integrated brake control sensor responsive to brake pedal position.

FIG. 10 illustrates a truck and trailer vehicle 300, individually truck 300a and trailer 300b, including a brake pedal 302 and an integrated brake position sensor 304. The integrated brake sensor 304 provides as output at least two electrical signals 306 to a brake control system 308. Brake control system 308 responds to the electrical signals 306 reported by sensor 304 as a function of pedal 302 position. Brake control system 308 thereby provides appropriate energy, e.g., such as by stored air pressure or hydraulic pressure (not shown), to the brakes 310 of vehicle 300 as a function of operator actuated positioning of pedal 302. The truck or front brake group 310a of truck 300a is thereby controlled independently of the trailer or rear brake group 310b of trailer 300b.

As may be appreciated, the brake sensor 304 may be constructed in similar fashion to that of the previously described integrated throttle sensors. In particular, a single mechanical input to a housing containing wipers bearing against resistive films and responsive to movement of the mechanical input by movement across the resistive films. The resistive films are relatively calibrated at the time of manufacture and can provide a variety of coordinated yet independent output signals 306 in response to a single mechanical input depending on the nature of the resistive characteristics of the film and relative film position. Thus, it will be understood that the sensor 304 may be adapted in a variety of configurations to provide a selected precalibrated relationship among the electrical signals 306 reported to brake control system 308 as a function of pedal 302 position. Important to note, the separate brake signals 306 developed by sensor 302 may originate from separate sources of energy, i.e., voltage potential sources, applied to sensor 302 and thereby satisfy certain vehicle control regulations requiring such separate sources of energy for production of separate control signals.

The particular brake pedal 302 and supporting assembly may vary according to manufacturing criteria, e.g., cost, and user preference, e.g., tactile response. It may be desirable, however, to employ a brake pedal 302 of generally similar structure to that of a throttle pedal. For example, the foot pedal arrangement for electrical throttle control of truck engines illustrated in U.S. Pat. No. 5,241,936 issued Sep. 7, 1993 to Jay D. Byler and James G. Honyak is considered suitable for such purpose. The disclosure of U.S. Pat. No. 5,241,936 is hereby incorporated fully by reference. In particular, the general structure of the pedal 302 can be similar to that of a throttle pedal used in truck 300. In this manner, a smaller number of parts need be maintained in an associated parts inventory. Furthermore, the sensor 304 would be mechanically mounted in similar fashion as that of a sensor mounted to a throttle pedal. In this manner, the overall mechanical arrangement of both the brake and throttle pedals as well as the associated position sensing devices would be similar and generally interchangeable. The brake pedal may, however, be adapted to provide the feel of a brake pedal, as opposed to a throttle pedal. For example, the springs used to bias the pedal to its neutral, i.e., non-braking, position may be stronger than those used in a throttle pedal to provide feedback to the operator more closely resembling that of a traditional brake pedal. In any event, compatibility of the various parts reduce the overall number of parts required in a given inventory, and thereby make more efficient any associated manufacturing or repair procedures relative to an inventory of brake and throttle parts.

Figure 11B:
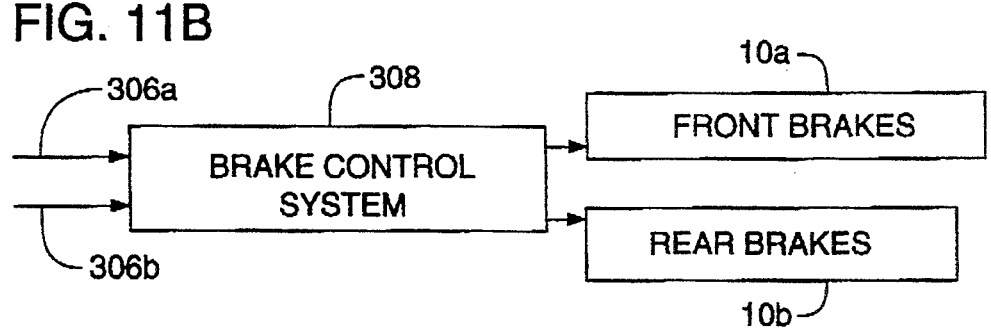
FIGS. 11A and 11B illustrate the relationship between mechanical operation of the sensor of FIG. 10 and the production of front and rear brake control signals in response to a mechanical input applied to the integrated brake control sensor of FIG. 10.
Figure 11A:
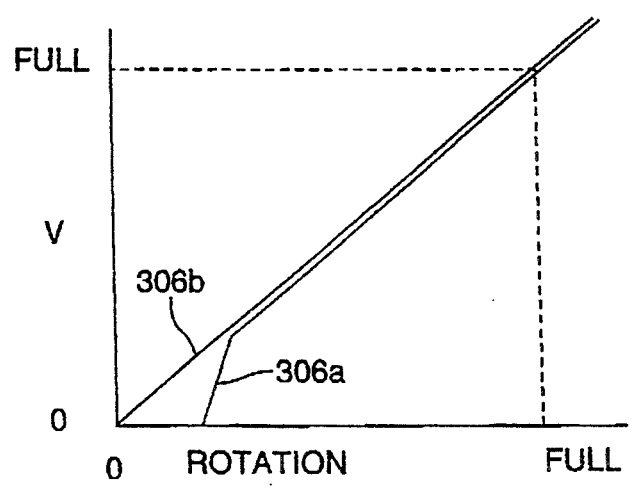

FIGS. 11A and 11B illustrate a signal relationship among the signals 306 providing a "rear first" braking function. Brake control system 308 applies signal 306a to control the front brake group 310a and signal 306b to control the rear brake group 310b. FIG. 11A illustrates the voltage potential of signals 306a and 306b through rotation of the common mechanical input to sensor 304. As seen in FIG. 11A, the rear brake signal 306b begins reporting increased voltage potential to system 308 prior to front brake signal 306a. Programming of the system 308 provides given braking magnitude as a function of the potential in the signals 306. The arrangement illustrated in FIG. 11 accomplishes "rear first" braking by developing voltage potential in the rear brake signal 306b prior to the front brake signal 306a. This eliminates any need for the brake control system 308 to establish, e.g., by programming or delay circuitry, an order of application relationship between front and rear braking functions.

Many large vehicles include an auxiliary or retarder brake system. Such brake systems are used when appropriate and allowed by law as an enhancement to the main frictional brake system to avoid excess wear on the main brake system. For example, large truck and trailer vehicles use a retarder brake system when going down steep grades for extended periods. This avoids excess heating and potential failure of the main brake system. The integrated brake control sensor of the present invention can coordinate use of a retarder brake system with a main frictional brake system.

Figure 12B:
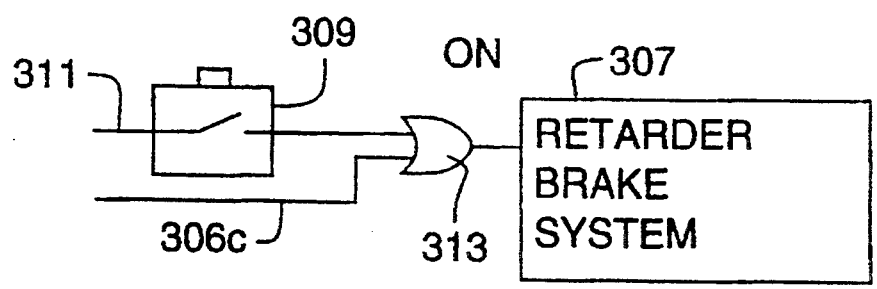
FIGS. 12A and 12B illustrate the relationship between mechanical operation of the integrated brake control sensor according to another embodiment of the present invention applied to coordinated operation of a retarder brake system and a main frictional brake system.
Figure 12A:
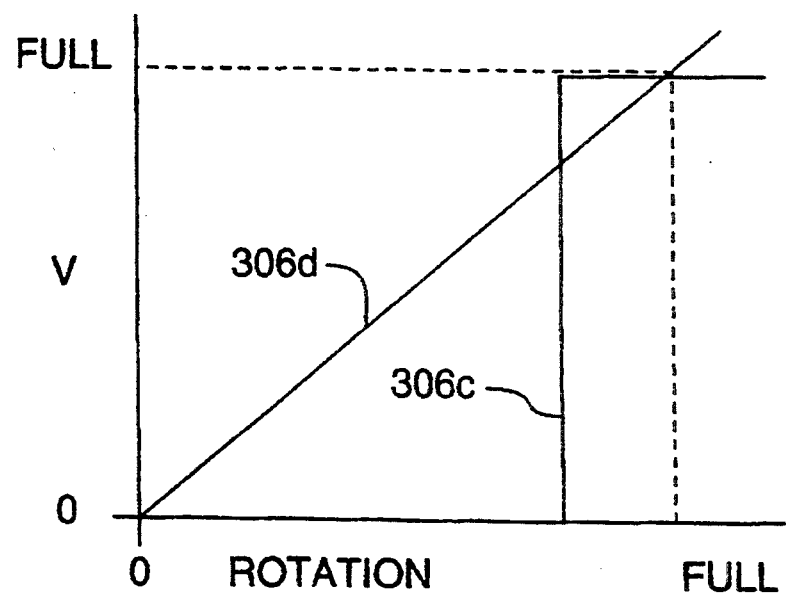

In FIG. 12A, a retarder brake system signal 306c and a main frictional brake signal 306d are illustrated across a given range of rotation for the mechanical input to the integrated brake sensor 304. The retarder brake system 307 (FIG. 12B) receives an active brake signal, i.e., a rising potential in the control signal 306c, at near full application of the brake pedal 302. As the brake pedal moves initially, however, the main frictional brake control signal 306d begins presenting increased voltage potential as desired to represent pedal 302 position. Thus, signal 306d applies an on/off control over the retarder brake system 307. The retarder brake system 307 is thereby applied when the brake pedal position is at or near the full brake position, i.e., when the rotational input to sensor 304 nears the full rotation position. In this manner, the retarder brake system signal 306c may be employed as an override signal applied to the retarder brake system 307 regardless of any established inhibition or disablement of the retarder brake system.

With reference to FIG. 12B, most vehicles having a retarder brake system 307 include a mechanism for engaging the retarder brake system whenever the throttle pedal is released and returns to its idle position. To allow such automatic activation of the retarder brake system, however, a dashboard inhibit switch 309 must be opened. When the inhibit switch is closed, however, the retarder brake system is automatically engaged when the throttle is released and a retarder brake signal 311 is asserted. Under the present invention, the retarder brake system signal 306c may bypass the inhibit switch 309 and provide an override signal always invoking the retarder brake system when the brake pedal is fully, or near fully, actuated. As illustrated in FIG. 12B, the output of inhibit switch 309, i.e., the switched form of retarder brake signal 311 as originating from the vehicle throttle, and the retarder brake system signal 306c are each applied as inputs to an OR gate 313. The output of OR gate 313 is applied to the ON input of retarder brake system 307. Thus, in an emergency situation, i.e., as indicated by full application of the brake pedal, the vehicle enjoys activation of all brake systems, i.e., including the retarder brake system 307, when needed despite any override or inhibition signal applied by way of switch 309 to the retarder brake system 307.

Figure 13B:
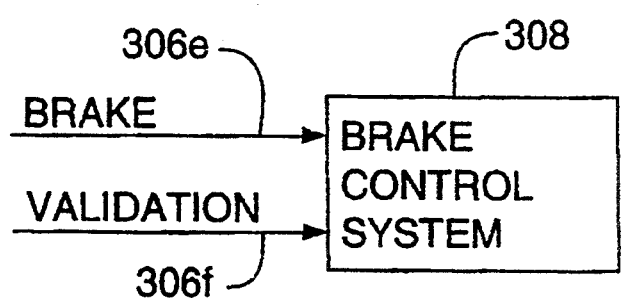
FIGS. 13A and 13B illustrate use of a brake control sensor for independent validation of active brake operation by a brake control system.
Figure 13A:
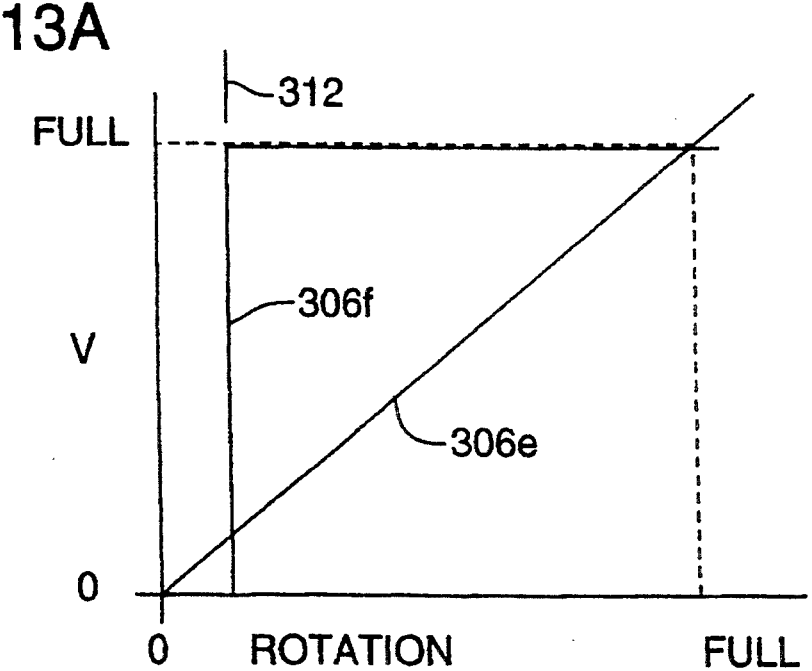

FIGS. 13A and 13B illustrate a brake validation function similar to that previously illustrated in connection with throttle control. In FIG. 13, a brake control signal 306e responds linearly to brake pedal position, i.e., rotation of the mechanical input to sensor 304. A separate validation signal 306f remains at zero potential to a given "brake active" transition point 312. Following transition point 312, the validation signal 306f goes to a given voltage potential as a separate validation to control system 308 (FIG. 13B) of a "brake active" condition. As may be appreciated, under certain brake control schemes it is important to separately validate an active brake condition before applying a braking function in response to an electrical brake control signal. Thus, brake control system 308 may use transition point 312 as a threshold beyond which braking functions will not be applied unless the validation signal 306f indicates an active brake condition.

Figure 14C:
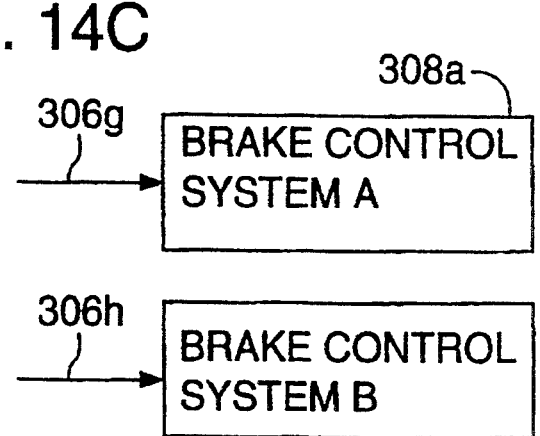
FIGS. 14A, 14B and 14C illustrate redundant production of identical brake signals as another form of brake signal validation, or alternatively use of separate but identical brake control signals for application to separate brake systems.
Figure 14B:
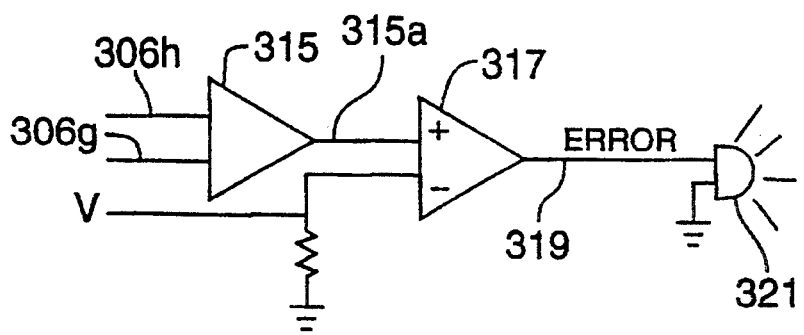
Figure 14A:
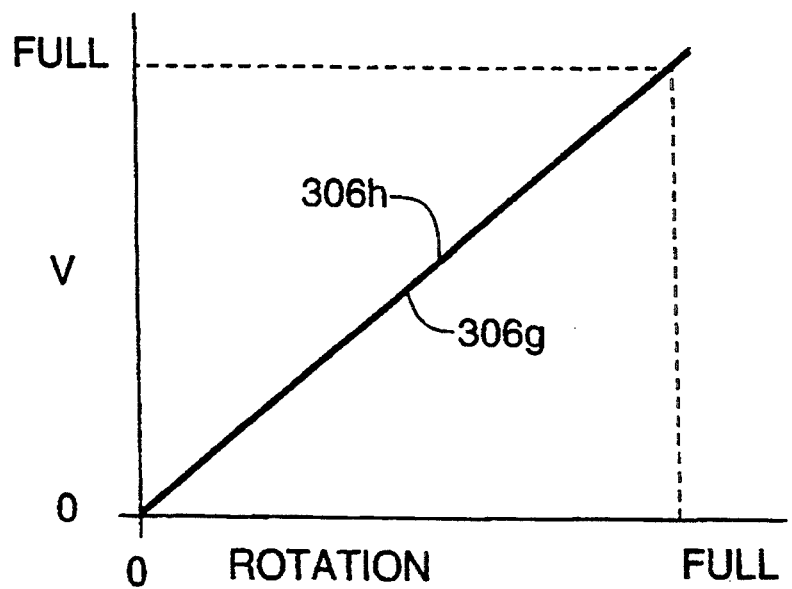

FIG. 14A illustrates another control scheme wherein a pair of signals 306, individually 306g and 306h and shown slightly separated for illustration only, rise in unison as the mechanical input rotates. Signals 306g and 306h are produced identically by the sensor 304 whereby system 308 may use each signal 306 to verify the other. More particularly, because each signal has a predetermined relationship, in this case identical magnitude, system 308 may simply compare signals 306g and 306h to detect differentiation in signal magnitude. Upon detecting a difference in the magnitude of signals 306g and 306h, an error condition is indicated and appropriate remedial action may be invoked.

In FIG. 14B, signals 306g and 306h are applied to a differential amplifier 315 of brake control system 308. The output 315a of amplifier 315 represents the absolute difference between the magnitudes of signals 306g and 306h. Thus, a zero magnitude output signal 315a indicates agreement in magnitude between the signals 306g and 306h. As an additional validation parameter, the output 315a may be applied to a second differential amplifier 317, with the negative input being applied to a selected threshold voltage, e.g., established by way of resister a resistor tied to ground potential. In this manner, an error signal 319 may be applied to a dashboard brake error indicator lamp 321 when the magnitude differential between signals 306g and 306h exceeds a given threshold value.

As may be appreciated, whatever predetermined, precalibrated relationship between signals 306g and 306h is established by the sensor 304, e.g., one being an given percentage of the other, system 308 may apply appropriate testing procedures to detect such predetermined, precalibrated relationship in connection with signal validation.

Furthermore, such identical signals 306g and 306h could be applied to separate brake systems for the purpose of coordinated and similar magnitude braking functions. In FIG. 14c, for example, the brake control system of vehicle 300 is bifurcated into separate brake control systems 308a and 308b. Signal 306g is applied to brake system 308a and brake control signal 306h is applied to brake control system 308b. In this manner, separate brake control systems receive identical magnitude brake control signals for coordinated operation from separate but precisely calibrated brake control signals.

Figure 15B:
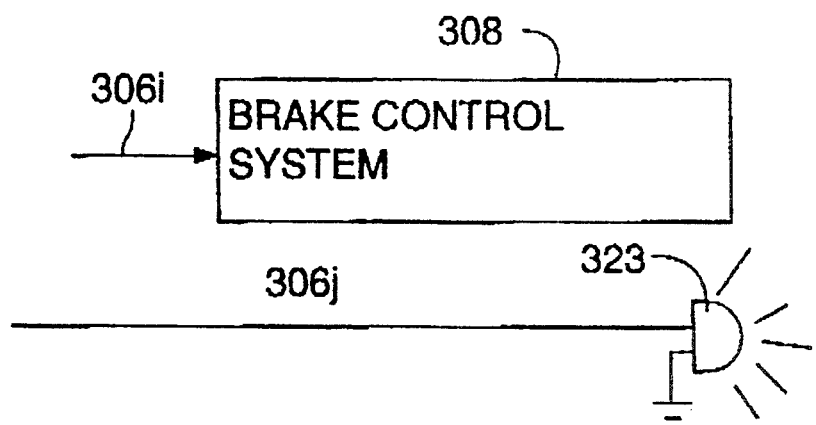
FIGS. 15A and 15B illustrate production of a brake control signal and a brake indicator signal in coordinated fashion as a function of brake pedal position.
Figure 15A:
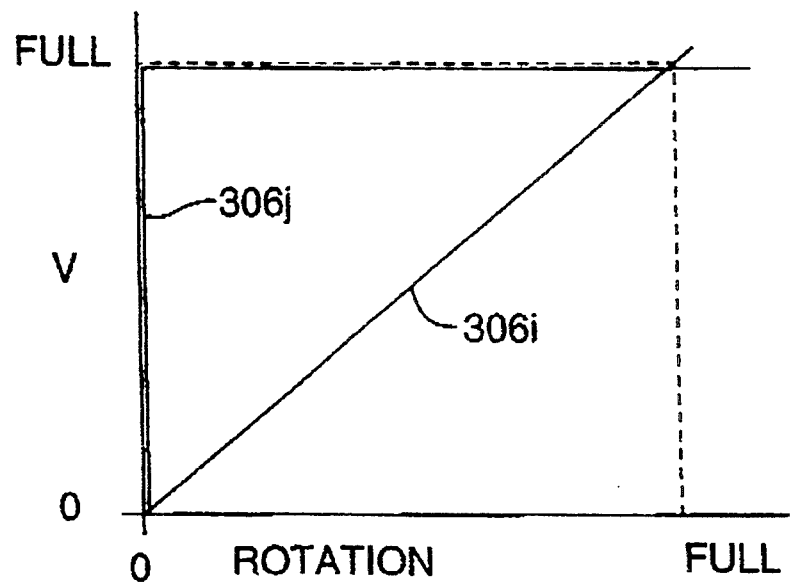

FIGS. 15A and 15B illustrate use of the sensor 304 to develop a brake position signal 306i and a brake light indicator signal 306j. As may be appreciated, the brake position signal 306i rises in potential linearly as the mechanical input to sensor 304 rotates through its range of rotation in response to brake pedal 302 position. The brake indicator light signal 306j rises substantially immediately to full potential upon first presentation of a non-zero magnitude in signal 306i. Thus, the brake light indicator 323 is activated as soon as the operator positions brake pedal 302 away from its normally biased, i.e., non-braking, position.

Figure 16:
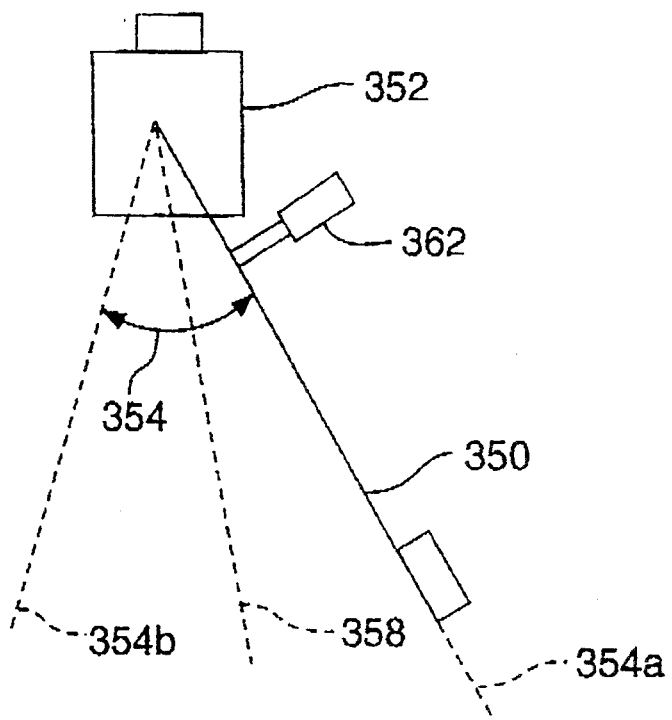
FIGS. 16 and 17 illustrate combined brake and throttle functions on a single control device by use of an integrated sensor device responsive to pedal position.

FIG. 16 illustrates a modified vehicle control device including combined functions of throttle and brake control. In FIG. 16, a throttle/brake pedal 350 is mechanically coupled to an integrated sensor 352. Brake pedal 350 moves through an angular range of motion 354. Pedal 350 is shown in FIG. 16 in its fully spring biased position at one extreme 354a of angular range 354. This position may be taken as a zero degree rotation position, with the other extreme 354b of range 354 referred to as a full rotation position.

Figure 17:
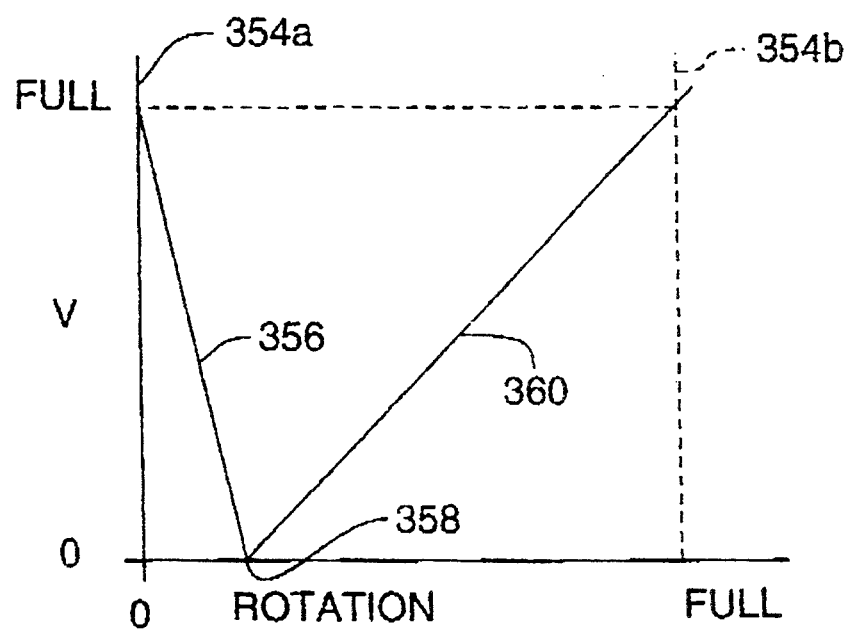

FIG. 17 illustrates signals produced by the integrated sensor 352 in response to positioning of pedal 350. In particular, a brake signal 356 goes from full potential to zero potential as pedal 350 moves from its zero rotation position to an idle position 358. As pedal 350 then moves from idle position 358 to its full rotation position, a separate throttle control signal 360 rises linearly in potential to a full throttle magnitude. Thus, an operator of a vehicle employing the arrangement of FIG. 16 can simply release pedal 350 to apply a fully braking force in response to the signal 356. With the pedal 350 normally biased to its zero rotation position, such full braking is automatically engaged upon release of the pedal 350. As may be appreciated, it may be desirable to include a dampening mechanism 362 to avoid sudden application of a full braking function upon release of the pedal 350. Furthermore, it may be desirable to provide a separate pedal (not shown) devoted exclusively to a braking function, i.e., a conventional brake pedal, to allow the operator to access a full brake condition if necessary. Thus, the operator would have the option of simply releasing pedal 350 to move toward a full brake condition under the influence of dampening mechanism 362, or can immediately apply full braking by use of a separate brake pedal.

As the operator moves the pedal 350 through its range of angular motion, the braking function diminishes to zero until the position 358 and then begins applying a throttle function as the pedal 350 moves to its full position. The arrangement illustrated in FIG. 16 is particularly useful in applications where it is desirable to allow the operator to simply release the control device and leave the vehicle in a fully braked condition. For example, it is considered useful in such applications as golf carts, and utility carts where vehicle speed is relatively slow and operators typically desire to frequently dismount the vehicle without excess involvement in vehicle control operations, i.e., setting a brake. Other uses might include vehicles engaging in constant acceleration and deceleration activities, e.g., forklifts, where operator expertise may be developed in manipulation of the pedal 350 to more conveniently execute such acceleration and deceleration functions by use of a single control device, i.e., by use of only the pedal 350. Also, it may be desirable to provide a tactile feedback to the operator of pedal 350 to indicate presence of pedal 350 at the position 358, i.e., when pedal 350 is in its idle throttle and non-braking position 358. For example, such tactile feedback could be provided by the dampening mechanism 362 having a detent or catch for capturing pedal 350 to some degree while located at the angular position 358. As may be appreciated, such catch or detent would necessarily be overcome by the spring bias of pedal 350, and also be easily overcome by operator applied pressure to pedal 350 toward the full rotation position 354b.

While signals produced by the brake sensor shown herein are linear in nature, it should be understood that a variety of signal shapes can be produced by appropriate manipulation of the film employed in producing the position sensor. For example, variation in the slurry used to define the resistive films can provide variation in resistance, and therefore variation in the signal response produced by the sensor. Also, variation in width of the sensors can produce a selected variation in signal response. Accordingly, it should be understood that nonlinear signal response, when desired, may be provided by an integrated brake control sensor of the present invention.

It will be appreciated that the present invention is not restricted to the particular embodiment or application that has been described and illustrated and that many variations may be made therein without departing from the scope of the invention as found in the appended claims and the equivalents thereof. For example, while the invention has been shown for a foot operated accelerator and brake pedals, it should be apparent that the invention may be applied to a variety of control devices where pre-calibrated signals are desired. Also, while the present invention has been illustrated in the context of electronic brake and fuel control systems it should be appreciated that the present invention may be applied to other motor control systems such as the control of an electrical motor. Generally, the present invention is applicable in any throttle control application where it is desirable to separately and independently validate or coordinate a control device position signal with a separate signal originating from the control device.

What is claimed is:

1. An integrated vehicle brake control device sensor system responsive to operator actuated movement of a vehicle brake control device, said system having a time of manufacture corresponding to integration of said system into a single package form, said integrated vehicle brake control device sensor system comprising:
    a mounting arrangement for attaching said vehicle brake control device sensor system to said vehicle brake control device;
    a first vehicle brake control device position sensor coupled to said mounting arrangement and responsive to operator actuated movement of said vehicle brake control device by providing a first vehicle brake control device position signal representing position of said vehicle brake control device; and
    a second vehicle brake control device position sensor coupled to said mounting arrangement, coupled in calibration to said first sensor at said time of manufacture and responsive to operator actuated movement of said vehicle brake control device to provide a second vehicle brake control device position signal, said calibration establishing a predetermined registration between said first and second position signals whereby upon attaching said vehicle brake control device sensor system to said vehicle brake control device said system responds to operator actuated movement of said vehicle brake control device by producing according to said predetermined registration said first and second vehicle brake control device position signals.

2. A system according to claim 1 further comprising a mechanical input positioned relative to said mounting arrangement to engage said brake control device whereby upon attachment of said vehicle brake control device sensor system to said vehicle brake control device said mechanical input moves according to movement of said vehicle brake control device, said first and second sensors being responsive to said vehicle brake control device by response to said mechanical input.

3. A system according to claim 2 further comprising a common housing including externally thereon said mounting arrangement and containing said first and second sensors, said mechanical input operating through said housing, said first and second position signals being delivered through said housing.

4. A system according to claim 1 wherein said first vehicle brake control device position signal represents a vehicle brake control device position along a first range of vehicle brake control device operator actuated movement and said second vehicle brake control device signal verifies vehicle brake control device position as being one of within and outside a second range of vehicle brake control device operator actuated movement.

5. A system according to claim 4 wherein said second range is a sub-range of said first range.

6. A system according to claim 1 wherein said first vehicle brake control device position signal is applied to a front brake system and said second vehicle brake control device position signal is applied to a rear brake system, the relative calibration between said first and second vehicle brake control device position signals providing indication of braking of the rear brake system prior to the front brake system.

7. A system according to claim 1 wherein said first vehicle brake control device position signal is applied to a retarder brake system and said second vehicle brake control device position signal is applied to a main frictional brake system, said first brake control device position signal providing a braking function after said second brake control device position signal.

8. An integrated vehicle brake control device sensor system responsive to operator actuated movement of a vehicle brake control device, said system having a time of manufacture corresponding to integration of said system into a single package form, said integrated vehicle brake control device sensor system comprising:
    a mechanical input and mounting arrangement for attaching said vehicle brake control device sensor system to said vehicle brake control device whereby said mechanical input moves according to said operator actuated movement of said vehicle brake control device;
    a first vehicle brake control device position sensor responsive to said mechanical input and providing a vehicle brake control device position signal representing position of said vehicle brake control device; and
    a second vehicle brake control device position sensor coupled in calibration to said first sensor at said time of manufacture and responsive to said mechanical input to provide a vehicle brake control device validation signal, said calibration establishing a predetermined registration between said position signal and said validation signal whereby upon attaching said vehicle brake control device sensor system to said vehicle brake control device said system responds to operator actuated movement of said vehicle brake control device by producing independently but but according to said predetermined registration said vehicle brake control device position signal and said vehicle brake control device validation signal.

9. A system according to claim 8 wherein said integrated vehicle brake control device sensor system further comprises a common housing containing said first and second sensors, said mechanical input operating through said housing, said vehicle brake control device position signal and said vehicle brake control device validation signal each being delivered through said housing.

10. A system according to claim 8 wherein said vehicle brake control device position signal represents a vehicle brake control device position along a first range of vehicle brake control device operator actuated movement and said vehicle brake control device validation signal verifies vehicle brake control device position as being one of within and outside a second range of vehicle brake control device operator actuated movement.

11. A system according to claim 10 wherein said second range is a sub-range of said first range.

12. A system according to claim 8 wherein said first vehicle brake control device position signal is applied to a front brake system and said second vehicle brake control device position signal is applied to a rear brake system, the relative calibration between said first and second vehicle brake control device position signals providing indication of braking of the rear brake system prior to the front brake system.

13. A system according to claim 8 wherein said first vehicle brake control device position signal is applied to a retarder brake system and said second vehicle brake control device position signal is applied to a main frictional brake system, said first control device position signal providing a braking function after said second control device position signal.

14. An integrated vehicle brake control device sensor system responsive to movement of a vehicle brake control device, said system having a time of manufacture corresponding to integration of said system into a single package form, the integrated vehicle brake control device sensor system comprising:
a sensor housing including a mounting arrangement for attaching said vehicle brake control device sensor system to said vehicle control device control device;
a mechanical input responsive to movement of said vehicle brake control device when said housing is attached to said vehicle brake control device control device, said mechanical input delivering within said housing a mechanical indication of vehicle brake control device position;
first and second sensors within said housing and coupled in calibration at said time of manufacture to provide a corresponding one of first and second vehicle brake control device position signals independently and as a function of said mechanical indication of vehicle brake control device position, said calibration establishing a predetermined registration between said first and second position signals; and
a signal delivery arrangement making available external of said housing said first and second vehicle brake control device position signals whereby upon mounting said vehicle brake control device sensor system to said vehicle brake control device said system provides in response to movement of said control device said first and second vehicle brake control device position signals independently but according to said predetermined registration.

15. A system according to claim 14 wherein said first vehicle brake control device position signal represents a vehicle brake control device position along a first range of vehicle brake control device movement and said second vehicle brake control device position signal is a position validation signal verifying vehicle brake control device position as being one of within and outside a second range of vehicle brake control device movement.

16. A system according to claim 15 wherein said second range is a sub-range of said first range.

17. A sensor according to claim 14 wherein said first and second vehicle brake control device position signals are applied to a vehicle brake system responsive to said first and second position signals in operation of a vehicle brake.

18. A sensor according to claim 14 wherein said first vehicle brake control device position signal is applied to a front brake system and said second vehicle brake control device position signal is applied to a rear brake system, the relative calibration between said first and second vehicle brake control device position signals providing indication of braking of the rear brake system prior to the front brake system.

19. A sensor according to claim 14 wherein said first vehicle brake control device position signal is applied to a retarder brake system and said second vehicle brake control device position signal is applied to a main frictional brake system, said first control device position signal providing a braking function prior to said second control device position signal.

* * * * *